J. R. GAMMETER.
CUSHION TIRE.
APPLICATION FILED DEC. 11, 1912.
1,175,431.
Patented Mar. 14, 1916.
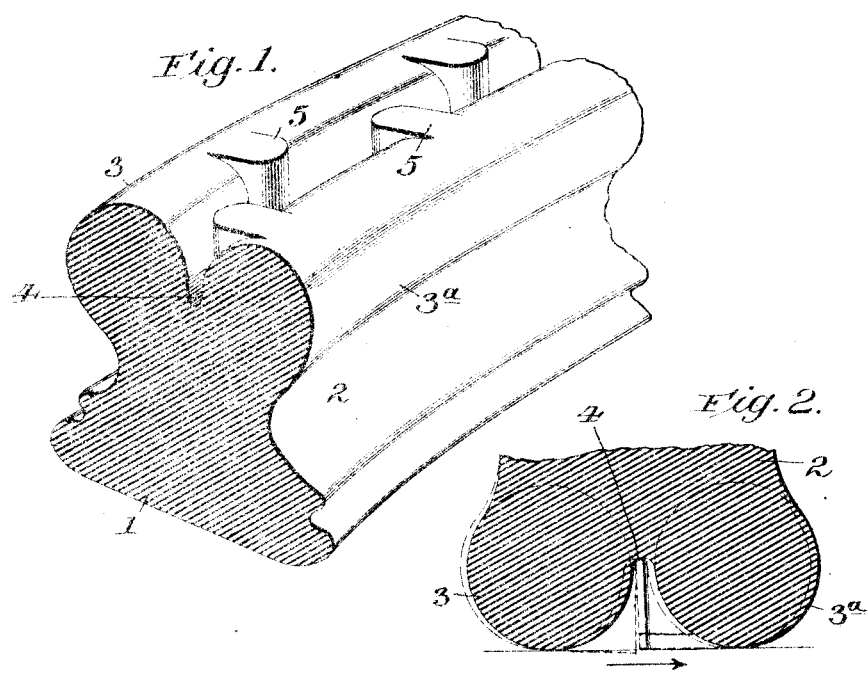
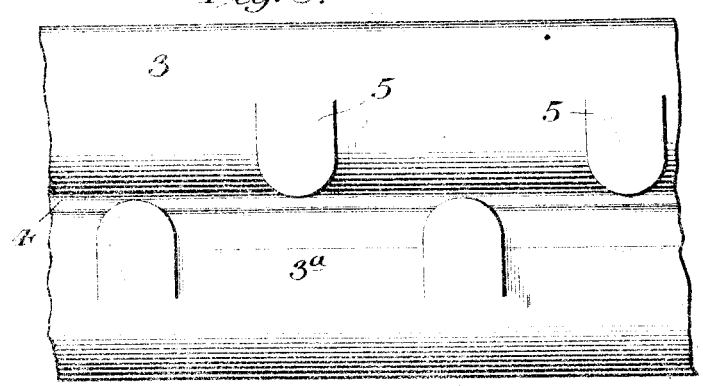
Witnesses:
E. J. Paider
H. E. Montague
Inventor:
John R. Gammeter,
By Dodge and Sons,
Attorneys

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

CUSHION-TIRE.

1,175,431.  Specification of Letters Patent.  Patented Mar. 14, 1916.

Application filed December 11, 1912. Serial No. 736,163.

*To all whom it may concern:*

Be it known that I, JOHN R. GAMMETER, citizen of the United States, residing at Akron, in the county of Summit and State of Ohio, have invented certain new and useful Improvements in Cushion-Tires, of which the following is a specification.

My present invention pertains to cushion tires, adapted for use more especially in connection with motor trucks, and the main object of the invention is to produce a durable tire which, while having sufficient resiliency, will likewise present a tread surface which will afford sufficient traction under both normal and abnormal road conditions.

The tire is shown in the annexed drawings, wherein—

Figure 1 is a perspective view of a portion of the tire; Fig. 2 a transverse sectional view of the tread portion; and Fig. 3 a top plan view thereof.

The base or main body of the tire is designated by 1 and may be of any desired form according to the construction of the rim or wheel to which it is to be secured.

The central portion, or what may be termed the body of the tire, designated by 2, is somewhat narrower than the base and is surmounted by two rounded tread members 3 and 3ᵃ, which overhang the side walls of the body proper. Stated in another way, it may be said that each side of the tire is undercut beneath the tread, or that each side is formed with a continuous rounded depression intermediate the base and the tread.

Each of the tread members or sections 3 and 3ᵃ is rounding, being substantially, though not necessarily, circular in contour or outline, and separated from the other member to a slight extent, where they merge into the upper portion of the tire-body 2, so as to produce an intervening channel or groove 4, which is narrowest at its bottom. Projecting from each of the tread members, inwardly into said groove, and preferably in alternation from the opposite tread members, are lugs or knobs 5, the knobs by preference being of the form shown, that is, having a flat top or outer face which lies in a plane coincident with the outer faces of the tread members, while the wall which extends within the groove or channel 4 is rounded. Thus a sinuous channel or groove is formed between the tread sections.

A tire thus constructed will be found to afford sufficient resiliency and at the same time presents a surface to the road which insures proper traction.

As will be noted upon reference to Fig. 2, not only do both of the tread surfaces proper bear upon the ground, but at least two or more of the lugs or knobs 5 (depending, of course, upon how closely they are spaced) likewise bear upon the ground, thereby not only increasing traction by reason of the additional surface which they present, but also, owing to their edges which stand transverse to the line of traction, causing the tire to grip the surface. Said lugs or knobs, when collectively considered, may be said to bridge the centrally-disposed groove or channel 4, and thus prevent the edge of a rail or the like from passing into said groove; or, if perchance, a rail should be forced into the same, the knobs tend to lift the wheel and assist it to ride off of the rail. Again, when there is a tendency to skid, and a consequent lateral displacement of the tread sections 3, 3ᵃ, such displacement or rocking motion of the sections will cause the knobs upon what may be termed the trailing tread to be thrown downwardly, causing their edges to bite into the surface. This will be readily appreciated upon reference to the dotted-line position of the parts in Fig. 2, it being assumed, that the tire is skidding in the direction indicated by the arrow, and that the section 3ᵃ is the trailing section. Moreover, while the tire presents all the advantages of a pocketed tread, as well as other advantages, it will readily clear itself of adhering mud and the like.

It is to be noted that the tread sections are continuous and by reason of such continuity, there is no tendency for them to tear or cut across. Further, while the knobs will wear to a greater or less extent, they do not present what might be termed an initial cut, as where the treads themselves are notched.

Having thus described my invention, what I claim is:

1. A tire-tread, presenting two separated tread surfaces, with a series of knobs extending from said surfaces into the groove or channel located between the same, said knobs at their ends terminating short of the adjacent tread surfaces.

2. A tire-tread, presenting two separated tread surfaces, with a series of knobs extending in alternation from said surfaces into the groove or channel located between the same.

3. A tire, comprising a base surmounted by a relatively narrow body portion having a pair of rounded treads formed as extensions of said body portion, the treads being separated and projecting laterally beyond the side walls of the body portion; and a plurality of lugs projecting in alternation from the adjacent side walls of the treads, and each terminating short of the opposite wall.

4. A tire, having two separated tread portions, and a series of projections extending in alternation from the adjacent walls thereof, whereby a sinuous groove or channel will be formed between said tread portions.

In testimony whereof I have signed my name to this specification in the presence of two subscribing witnesses.

JOHN R. GAMMETER.

Witnesses:
ROBERT M. PIERSON,
WALTER K. MEANS.